(12) United States Patent
Liu et al.

(10) Patent No.: US 11,074,148 B2
(45) Date of Patent: Jul. 27, 2021

(54) METHOD AND SYSTEM FOR VISUALLY DISPLAYING A BIOS MESSAGE DURING A POWER-ON SELF-TEST

(71) Applicant: MITAC COMPUTING TECHNOLOGY CORPORATION, Hsinchu (TW)

(72) Inventors: Chung-Huang Liu, Taoyuan (TW); Chen-Nan Hsiao, New Taipei (TW)

(73) Assignee: MITAC COMPUTING TECHNOLOGY CORPORATION, Hsinchu (TW)

( * ) Notice: Subject to any disclaimer, the term of this patent is extended or adjusted under 35 U.S.C. 154(b) by 101 days.

(21) Appl. No.: 16/551,947

(22) Filed: Aug. 27, 2019

(65) Prior Publication Data

US 2020/0073773 A1 Mar. 5, 2020

(30) Foreign Application Priority Data

Aug. 28, 2018 (TW) .................... 107129982

(51) Int. Cl.
| | | |
|---|---|---|
| G06F 11/00 | (2006.01) | |
| G06F 11/22 | (2006.01) | |
| G06F 9/4401 | (2018.01) | |
| G06F 11/32 | (2006.01) | |
| G06F 11/14 | (2006.01) | |

(52) U.S. Cl.
CPC ........ *G06F 11/2284* (2013.01); *G06F 9/4406* (2013.01); *G06F 11/1417* (2013.01); *G06F 11/328* (2013.01)

(58) Field of Classification Search
CPC .......................... G06F 11/2284; G06F 9/4406
See application file for complete search history.

(56) References Cited

U.S. PATENT DOCUMENTS

| | | | | |
|---|---|---|---|---|
| 2013/0159770 A1* | 6/2013 | Gao | .................... | G06F 11/2284 714/27 |
| 2016/0261455 A1* | 9/2016 | Su | ........................ | H04L 41/0686 |
| 2016/0363978 A1* | 12/2016 | Gonzales | ................ | G06F 1/266 |
| 2018/0226051 A1* | 8/2018 | Swaminathan | ........ | G09G 5/395 |

FOREIGN PATENT DOCUMENTS

TW I584196 B 5/2017

OTHER PUBLICATIONS

Search Report appended to an Office Action, which was issued to Taiwanese counterpart application No. 107129982 by the TIPO dated Oct. 25, 2019, with an English translation thereof.

* cited by examiner

*Primary Examiner* — Philip Guyton
(74) *Attorney, Agent, or Firm* — Brinks Gilson & Lione

(57) ABSTRACT

A method for displaying a basic input-output system (BIOS) message during a power-on self-test (POST) of a computer system includes: after the computer system is connected to a power source, performing, by a baseboard management controller (BMC), an initialization procedure on a display unit so as to control the display unit; executing, by a processor, a BIOS stored in a memory component so as to generate the BIOS message; transmitting, by the processor, the BIOS message to the BMC; and transmitting, by the BMC, the BIOS message to the display unit.

14 Claims, 3 Drawing Sheets

METHOD AND SYSTEM FOR VISUALLY DISPLAYING A BIOS MESSAGE DURING A POWER-ON SELF-TEST

CROSS-REFERENCE TO RELATED APPLICATION

This application claims priority of Taiwanese Patent Application No. 107129982, filed on Aug. 28, 2018.

FIELD

The disclosure relates to a method and a computer system for visually displaying a basic input-output system (BIOS) message during a power-on self-test (POST) of a computer system.

BACKGROUND

Typically, when a computer system is started (e.g., after a power button is pressed), a processor is configured to execute pre-stored software and/or firmware for performing a power-on self-test (POST) to check whether each of the components included in the computer system and any externally connected component is functional.

A conventional POST is typically performed in a predetermined sequence that first checks those components that are essential to normal operation of the computer system (e.g., a central processing unit (CPU), random access memory (RAM), a motherboard, etc.) in earlier stages (e.g., a SEC stage for initializing a CPU cache, a PEI stage for initializing the CPU, a chipset, the motherboard) of the POST. Afterward, other components (e.g., a graphics card, an externally connected component, buses such as PCI, USB, SATA and service drivers, etc.) are initialized in, for example, a middle stage of the POST (e.g., a DXE stage).

During the POST, when an error of an essential component is detected, the computer system may not be able to properly complete a boot sequence, and the POST and other procedure are halted (a situation known as BIOS hang). On the other hand, when an error of a non-essential component is detected (which does not result in BIOS hang), the processor may continue performing the POST after generating an error code to be displayed on a seven-segment display that is connected to a specific port (e.g., I/O port 80h). In such cases, depending on the error that had occurred, an error code may be outputted in the form of audio beep(s), and/or a code that indicates the error, where different error message corresponding to different errors may have different numbers of beeps and/or different beeping patterns.

It is noted that while in the initial stage of the POST, when an error is detected, information associated with the error (e.g., an error code) cannot be displayed on the screen since the graphics card that is used to generate a feed of output images to the screen has not yet been initialized and checked. As a result, the information associated with the error is outputted in a form of a sequence of beeps by a speaker, and a user is not able to visually see the error information to address the error detected in the initial stage of the POST.

Additionally, the error information displayed on the screen is typically in the form of a code (e.g., a debug code), and may not be comprehended by non-professional users without a more detailed description.

SUMMARY

One object of the disclosure is to provide a method for displaying a basic input-output system (BIOS) message during a power-on self-test (POST) of a computer system.

According to the disclosure, the method is implemented using the computer system. The computer system includes a processor, a baseboard management controller (BMC), a display unit that is coupled to the processor and the baseboard management controller, and a memory component that stores a BIOS therein. The method includes:

a) after the computer system is powered on, performing, by the BMC, an initialization procedure on the display unit so as to control the display unit;

b) executing, by the processor, the BIOS so as to generate a BIOS message;

c) transmitting, by the processor, the BIOS message to the BMC; and d) transmitting, by the BMC, the BIOS message to the display unit.

Another object of the disclosure is to provide a non-transitory computer-readable medium storing instructions that, when executed by a processor and a BMC of a computer system, cause the processor and the BMC to perform the above-identified method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
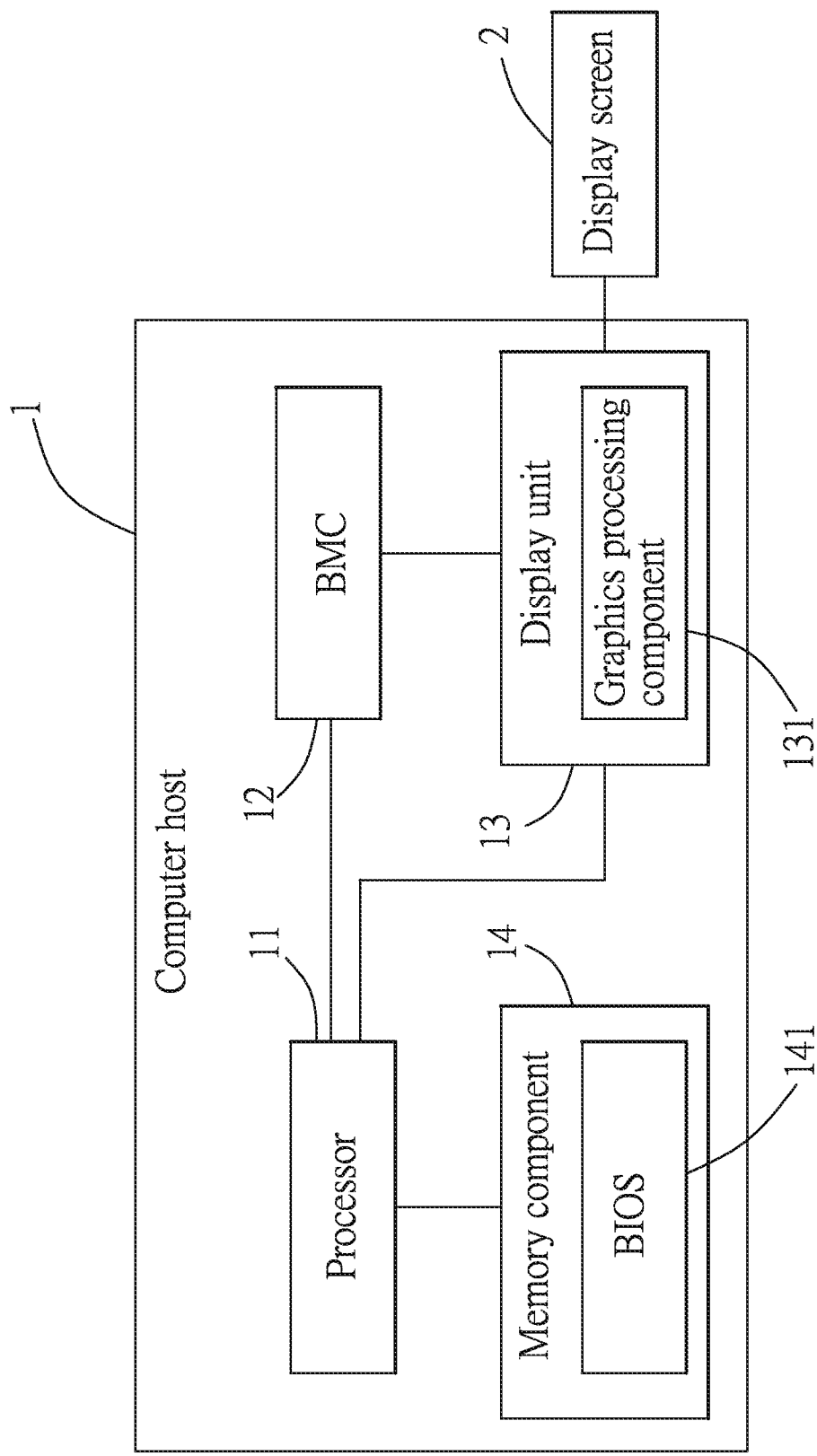
FIG. 1 is a block diagram illustrating components of a computer system according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating components of a computer system according to one embodiment of the disclosure. In this embodiment, the computer system includes a computer host 1, and a display screen 2 connected to the computer host 1.

The computer host 1 includes a processor 11, a baseboard management controller (BMC) 12, a display unit 13 and a memory component 14.

The processor 11 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc. The display unit 13 is connected to the processor 11, the BMC 12 and the display screen 2, and includes a graphics processing component 131 that may be embodied using a graphics card.

The memory component 14 may be embodied using one or more of read-only memory (ROM), random access memory (RAM), a dual in-line memory module (DIMM) and other non-transitory storage medium, and stores a basic input-output system (BIOS) 141 therein.

Typically, when the computer host 1 is started (i.e., when a power button is pressed), the processor 11 is configured to execute the BIOS 141 for performing a power-on self-test (POST) to check whether each of the components included in the computer system and any externally connected component (also known as a peripheral device) is functional. During the POST, a BIOS message is generated, indicating whether an error related to one or more component (s) built in the computer system or externally connected to the computer system has occurred. For example, when no error is detected, the BIOS message indicates that "system is normal and functional". In this embodiment, when an error is detected, the BIOS message may include an error code that may be outputted using the display screen 2. A BIOS message that indicates an error may also be referred to as a BIOS error message.

Figure 2:
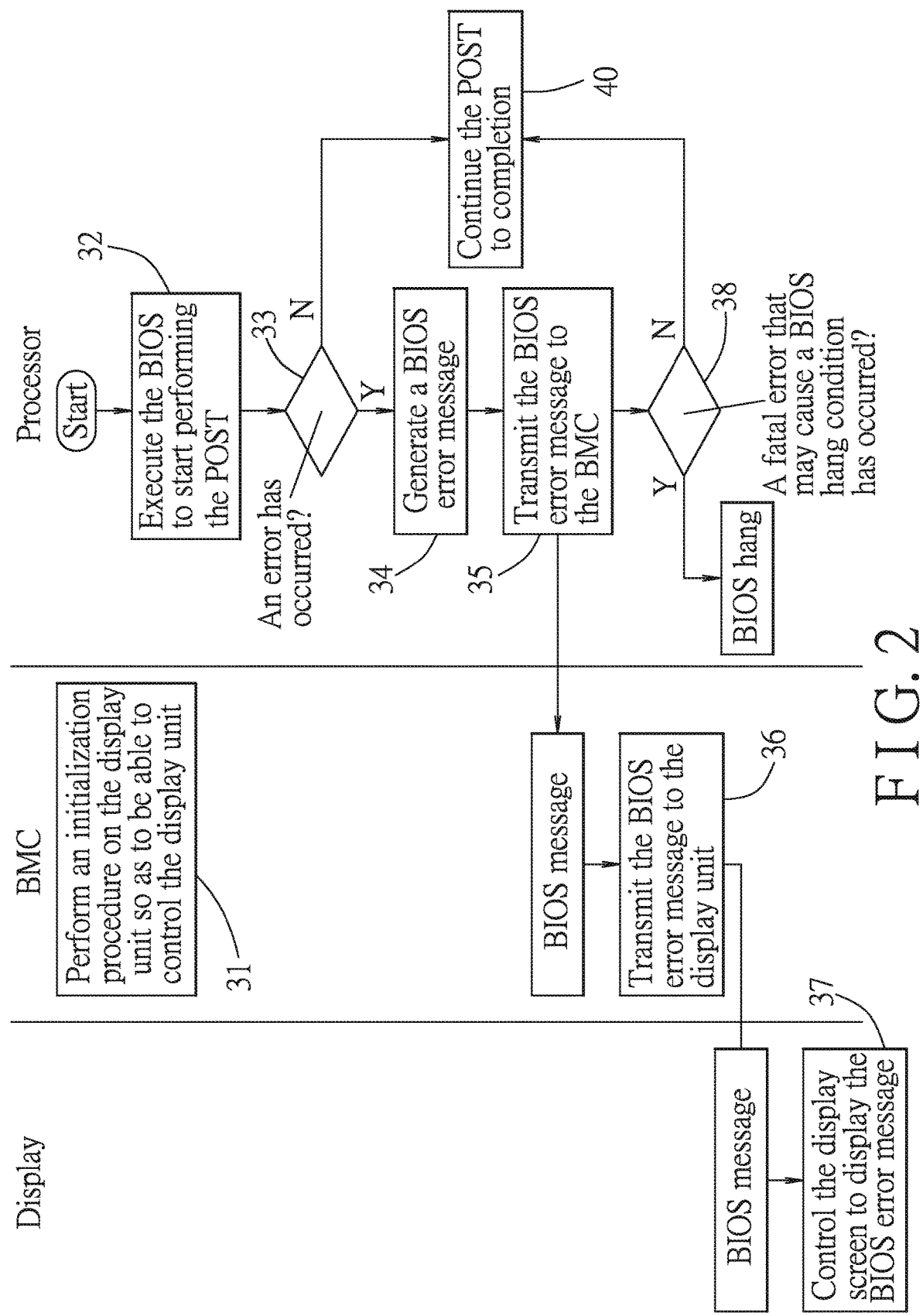
FIG. 2 is a flow chart illustrating steps of a method for visually displaying the BIOS message during the POST according to one embodiment of the disclosure.

FIG. 2 is a flow chart illustrating steps of a method for displaying the BIOS message during the POST according to one embodiment of the disclosure. In this embodiment, the method is performed by the computer system of FIG. 1.

After the computer system is powered on, in step 31, the BMC 12 performs an initialization procedure on the display unit 13 so as to be able to control the display unit 13. Specifically, firmware of the BMC 12 may be adjusted to include instructions (e.g., programming language or codes) for performing the initialization procedure on the display unit 13. It is noted that, conventionally, the initialization procedure on the display unit 13 is performed by the processor 11 at a later stage of the POST, and after being initialized, the graphics processing component 131 of the display unit 13 is able to generate a display signal (e.g., a series of images) and transmit the display signal to the display screen 2, so as to control the display screen 2 to display the display signal. In this embodiment, by virtue of the adjusted firmware of the BMC 12, the initialization procedure on the display unit 13 is performed independently of the POST, and the display unit 13 is configured to be able to control the display screen 2 after step 31.

It is noted that in embodiments, step 31 may be implemented after the computer host 1 is connected to a power source such as a power outlet, a battery, etc. prior to the power button being pressed. This configuration is possible since the BMC 12 may be operational even before the computer host 1 is powered on and started. In some embodiments, step 31 is implemented as soon as the computer host 1 is powered on and started. In step 32, the processor 11 executes the BIOS 141 to start performing the POST. In the POST, a number of checkup procedures are performed sequentially on each of the components, with the display unit 13 being checked at a later stage. Additionally, a number of checkup procedures regarding other aspects of the computer host (e.g., checking of an electrical current, a voltage, etc.) are also included in the POST. In some embodiments, steps 31 and 32 are executed simultaneously. In use, the BIOS 141 includes a plurality of sub-programs. Each of the sub-programs corresponds with one of the checkup procedures and includes software instructions that enable or initiate a component and the sub-programs are executed by the processor 11 to perform the corresponding one of the checkup procedures.

During the POST, whenever an error is detected, a BIOS message including information related to the error is generated.

Specifically, in step 33, the processor 11 executes the BIOS 141 to perform one of the checkup procedures for a corresponding component or other aspects of the computer system. For such a checkup procedure, one of two outcomes may occur: one or more errors are detected, or no error is detected.

When no error is detected for the component, the flow proceeds to step 40, in which the POST continues to completion (i.e., each and every to-be-checked component, for example, CPU, main memory, etc., has been checked). For example, in some embodiments, the processor 11 may look up a pre-established checklist for determining whether each and every component (either built in the computer system or a peripheral device) which is listed on the checklist has been checked.

On the other hand, when an error is detected in step 33, a BIOS message (e.g., a BIOS error message) is generated in step 34. That is to say, in some cases where an error is detected, after a part of the POST has been performed, the BIOS error message is generated. In this embodiment, the BIOS error message includes visually conceivable information about the detected error. In some embodiments, the BIOS error message may further include an error code that is associated with the detected error identified in the POST. In addition, the visually conceivable information of the BIOS error message includes text message indicating at least one of a cause of the error or an identified component of the computer system that relates to the detected error.

In one embodiment, the implementation of step 34 may be done by adding a predetermined program module to each of the sub-programs. The predetermined program module may include instructions that, for each of the sub-programs when it is determined that the sub-program is not successfully executed, cause the processor 11 to access the sub-program to obtain a name of the identified component and a cause of error associated with the sub-program. As such, the BIOS error message as described above may be generated and displayed for the user.

Specifically, in the case that the computer system includes a plurality of processors, when an error related to one of the processors is detected, the BIOS error message is generated to include a location concerning a channel (e.g., a CPU channel) that is connected to the one of the processors. When an error related to a memory module, the BIOS error message is generated to include a location associated with a slot in which the memory module is inserted (e.g., a DIMM slot). When an error related to a peripheral device is detected, the BIOS error message is generated to include an interface port to which the peripheral device is connected.

In step 35, the processor 11 transmits the BIOS error message to the BMC 12. Specifically, in this embodiment, the BIOS error message is transmitted via an Intelligent Platform Management Interface (IPMI).

In step 36, the BMC 12 transmits the BIOS error message to the display unit 13. In turn, in step 37, the graphics processing component 131 of the display unit 13 controls the display screen 2 to display the BIOS error message that includes the cause of the error and/or the identified component of the computer system that relates to the detected error.

In this manner, the BIOS error message, which may include the cause of the error and/or the identified component of the computer system, may be displayed on the display screen 2 at a very early stage of POST, or as soon as the POST is started.

In step 38, regarding the error detected in step 33, two outcomes may occur: the error is a fatal error (e.g., an error of an essential component) that may result in the POST and other procedure (s) to be halted (a condition known as BIOS hang), or the error is a non-fatal error.

When it is determined that a fatal error has occurred, the POST is terminated, while the BIOS error message is being displayed on the display screen 2. On the other hand, when no fatal error has occurred, the flow proceeds to step 40 to continue the POST until completion.

In such a case, the processor 11 continues the POST, while the BIOS error message is displayed on the display screen 2.

It is noted that at a later stage of the POST, the processor 11 performs an initialization procedure on the display unit 13 so as to control the display unit 13 (e.g., when it is the turn for the display unit 13 to be checked for error). At this stage, the component controlling the display unit 13 shifts from the BMC 12 to the processor 11, and the remaining parts of the POST is implemented in a normal manner. It is noted that the error message generated before the processor 11 performing an initialization procedure on the display unit 13 may still be visible on the display screen 2 until the POST is completed.

In one embodiment, the implementation of step 38 may be done before step 34. That is to say, upon detecting that an error has occurred, the processor 11 may directly determine whether the error is a fatal error before generating and transmitting the BIOS error message.

Figure 3:
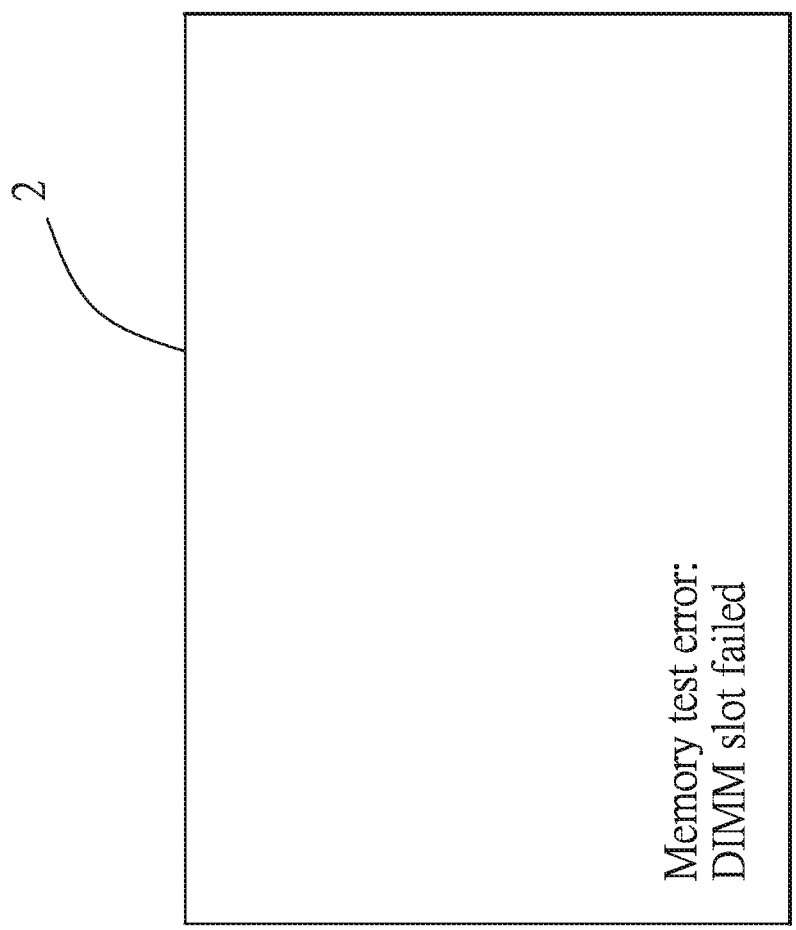
FIG. 3 illustrates an exemplary BIOS message that is displayed on a display screen.

In one example shown in FIG. 3, during the POST, the processor 11 detects an error on a memory module connected via a "DIMM slot 1" (not shown) in step 33. In response, in step 34, the processor 11 generates the BIOS error message that includes the cause of the error and/or the identified component that relates to the error. One exemplary BIOS error message may be in the text form of "Memory test error: DIMM slot 1 failed". Then, the BIOS error message is transmitted to the BMC 12, and the display unit 13, and displayed by the display screen 2.

In this manner, the BIOS error message may be displayed at any stage of the POST, and in a more comprehensive way (in text instead of a code or an audio representation). It is noted that such a configuration may be particularly beneficial for a developer or a user in identifying and fixing the error.

When it is determined that the POST is not yet completed in step 40, the flow goes back to step 33 to check another one of the to-be-checked components. Otherwise, a BIOS message is generated to indicate system information of the computer system.

It is noted that in cases that the POST is completed without detecting an error of any kind, the BIOS message may include status information concerning at least one component of the computer system. For example, for each of the components that has been checked in the POST, a status message regarding the component may be generated as a part of the BIOS message. The status message may include a name of the component and a current status of the component.

The BIOS message is then transmitted to the display unit 13 via the BMC 12 and displayed by the display screen 2.

In brief, the display unit 13 is first initialized by the BMC 12 and is available to display messages. When the computer is powered on and the POST is started, any error message that is generated during the early stages of the POST (i.e., the checkup procedures scheduled before the initialization of the display unit 13) may be included in the BIOS message and transmitted from the BMC 12 to the display unit 13 via the BMC 12 and displayed by the display screen 2. After the processor 11 performs one of the checkup procedures to initialize the display unit 13, control of the display unit 13 is switched from the BMC to the processor 11, which controls the display unit 13 to continue displaying the BIOS message and performs the remaining checkup procedures until the POST is completed.

To sum up, the embodiments of the disclosure provide a method and a computer system that are configured to initialize the display unit 13 using the BMC 12 as soon as the computer system is connected to the power source (which may be prior to the computer system being powered on), and that enable the BIOS message which may include an error detected during the POST, the cause of the error and/or the location of the identified component that relates to the error, to be displayed on the display screen 2 as early as the start of the POST. In such a manner, as soon as the computer system is started, the display unit 13 may be already activated to be ready to display the BIOS message. It is noted that a form of the BIOS error message may be presented in a more comprehensible way to non-professional users (as shown in FIG. 3), as compared to the conventional error codes, which may require looking up additional materials (e.g., a lookup table) to determine the type of error and/or the location of the identified component.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for visually displaying a basic input-output system (BIOS) message during a power-on self-test (POST) of a computer system, the computer system including a processor, a baseboard management controller (BMC), a display unit that is coupled to the processor and the baseboard management controller, and a memory component that stores a BIOS therein, the method comprising the steps of:

a) after the computer system is connected to a power source, performing, by the BMC, an initialization procedure on the display unit so as to control the display unit;

b) executing, by the processor, the BIOS so as to start performing the POST, and to generate a BIOS message based on the POST, the BIOS including a plurality of sub-programs;

c) transmitting, by the processor, the BIOS message to the BMC; and d) transmitting, by the BMC, the BIOS message to the display unit;

the method further comprising, after step d): performing, by the processor, an initialization procedure on the display unit so as to control the display unit, wherein the initialization procedure on the display unit is performed by the processor at a later stage of the POST, and the processor controls the display unit to continue displaying the BIOS message and performs a number of remaining checkup procedures of the POST until the POST is completed;

the BIOS message includes visually conceivable information about an error identified during the POST; and the BIOS message further includes at least one of a cause of the error or an identified component of the computer system that relates to the error;

wherein in step b), the generation of the BIOS message includes executing, by the processor, a predetermined program module including instructions that, for each of the sub-programs when it is determined that the sub-program is not successfully executed, cause the processor to access the sub-program to obtain a name of the identified component and a cause of error associated with the sub-program.

2. The method of claim 1, wherein the BIOS message further includes an error code that is associated with the error identified during the POST.

3. The method of claim 1, the display unit including a graphics processing component, the computer system further including a display screen that is connected to the graphics processing component, wherein:

step a) includes performing an initialization procedure on the graphics processing component of the display unit;

step d) includes transmitting the BIOS message to the graphics processing component of the display unit; and the method further comprises, after step d), a step of controlling, by the graphics processing component, the display screen to display the BIOS message.

4. The method of claim 1, wherein in step c), the processor transmits the BIOS message via an Intelligent Platform Management Interface (IPMI).

5. The method of claim 1, the display unit including a graphics processing component, the computer system further including a display screen that is connected to the graphics processing component, wherein:

step a) includes performing an initialization procedure on the graphics processing component of the display unit;

step d) includes transmitting the BIOS message to the graphics processing component of the display unit; and the method further comprises, after step d), a step of controlling, by the graphics processing component, the display screen to display the BIOS message.

6. The method of claim 1, wherein step b) is implemented after a power button of the computer system is pressed.

7. The method of claim 1, wherein in step a), the initialization procedure is performed by the BMC executing firmware thereof that includes instructions for performing the initialization procedure on the display unit.

8. The method of claim 1, wherein the BIOS message includes status information concerning at least one component of the computer system.

9. A non-transitory computer-readable medium storing instructions that, when executed by a processor of a computer system, cause the processor to implement a method, the method comprising:

a) after the computer system is connected to a power source, performing, by a BMC of the computer system, an initialization procedure on a display unit of the computer system, so as to control the display unit;

b) executing, by the processor, a BIOS stored in the computer system, so as to start performing the POST, and to generate a BIOS message based on the POST, the BIOS including a plurality of sub-programs;

c) transmitting, by the processor, the BIOS message to the BMC; and d) transmitting, by the BMC, the BIOS message to the display unit;

the method further comprising, after step d): performing, by the processor, an initialization procedure on the display unit so as to control the display unit, wherein the initialization procedure on the display unit is performed by the processor at a later stage of the POST, and the processor controls the display unit to continue displaying the BIOS message and performs a number of remaining checkup procedures of the POST until the POST is completed;

the BIOS message includes visually conceivable information about an error identified during the POST; and the BIOS message further includes at least one of a cause of the error or an identified component of the computer system that relates to the error;

wherein in step b), the generation of the BIOS message includes executing, by the processor, a predetermined program module including instructions that, for each of the sub-programs when it is determined that the sub-program is not successfully executed, cause the processor to access the sub-program to obtain a name of the identified component and a cause of error associated with the sub-program.

10. The non-transitory computer-readable medium of claim 9, wherein the BIOS message further includes an error code that is associated with the error identified in the POST.

11. The non-transitory computer-readable medium of claim 9, the display unit including a graphics processing component, the computer system further including a display screen that is connected to the graphics processing component, wherein:

step a) includes performing an initialization procedure on the graphics processing component of the display unit;

step d) includes transmitting the BIOS message to the graphics processing component of the display unit; and the method further comprises, after step d), a step of controlling, by the graphics processing component, the display screen to display the BIOS message.

12. The non-transitory computer-readable medium of claim 9, the display unit including a graphics processing component, the computer system further including a display screen that is connected to the graphics processing component, wherein:

step a) includes performing an initialization procedure on the graphics processing component of the display unit;

step d) includes transmitting the BIOS message to the graphics processing component of the display unit; and the method further comprises, after step d), a step of controlling, by the graphics processing component, the display screen to display the BIOS message.

13. The non-transitory computer-readable medium of claim 9, wherein step b) is implemented after a power button of the computer system is pressed;
- wherein the initialization procedure is performed by the BMC executing firmware thereof, the firmware including instructions for performing the initialization procedure on the display unit.

14. The non-transitory computer-readable medium of claim 13, wherein the method further comprises, after step b):
- determining, by the processor, whether a fatal error that causes a BIOS hang condition has occurred; and
- when it is determined that no fatal error has occurred, performing a remaining part of the POST that has not yet been performed.

* * * * *